(12) United States Patent
Knauer

(10) Patent No.: US 10,227,248 B2
(45) Date of Patent: Mar. 12, 2019

(54) APPARATUS AND METHOD FOR TREATING SLURRIES

(71) Applicant: Ecolab USA Inc., Saint Paul, MN (US)

(72) Inventor: Jochen Friedrich Knauer, Bad Homburg (DE)

(73) Assignee: Ecolab USA Inc., Saint Paul, MN (US)

( * ) Notice: Subject to any disclaimer, the term of this patent is extended or adjusted under 35 U.S.C. 154(b) by 449 days.

(21) Appl. No.: 14/997,646

(22) Filed: Jan. 18, 2016

(65) Prior Publication Data
US 2016/0130167 A1 May 12, 2016

Related U.S. Application Data

(60) Division of application No. 13/715,373, filed on Dec. 14, 2012, now Pat. No. 9,289,705, which is a
(Continued)

(30) Foreign Application Priority Data

Jun. 15, 2010 (DE) .................. 10 2010 023 793

(51) Int. Cl.
*C02F 11/14* (2006.01)
*B01D 37/03* (2006.01)
*B01F 7/00* (2006.01)

(52) U.S. Cl.
CPC .............. *C02F 11/14* (2013.01); *B01D 37/03* (2013.01); *B01F 7/007* (2013.01); *B01F 7/0025* (2013.01);
(Continued)

(58) Field of Classification Search
CPC .... C02F 11/14; C02F 2303/26; B01F 7/0025; B01F 7/007; B01F 7/00141; B01F 7/00125; B01F 7/00291; B01D 37/03
See application file for complete search history.

(56) References Cited

U.S. PATENT DOCUMENTS

| 2,592,709 A | 4/1952 | Kinnaird |
| 6,345,908 B1 | 2/2002 | Gmeiner |

(Continued)

FOREIGN PATENT DOCUMENTS

| DE | 74618 | 5/1894 |
| DE | 3719441 A1 | 12/1988 |

(Continued)

OTHER PUBLICATIONS

Korean Patent Application No. 10-2013-7001002, Office Action dated Mar. 20, 2015, 25 pages (14 Pages English Translation).
(Continued)

*Primary Examiner* — Krishnan S Menon
*Assistant Examiner* — Waqaas Ali
(74) *Attorney, Agent, or Firm* — Fredrikson & Byron, P.A.

(57) ABSTRACT

An apparatus for treating slurries, in particular biogenic or industrial slurries, can include at least one treatment rotor which is arranged or can be arranged in the slurry and which rotates or is rotatable about an axis of rotation (R), with treatment elements which project outward, as seen from the axis of rotation (R), and between which interspaces are formed, at least some of the treatment elements having, at—at least one, preferably each—adjacent interspace, in each case at least one treatment edge, preferably at least two treatment edges spaced apart from one another, each of these treatment edges running from the inside outward, as seen from the axis of rotation. Methods for treating slurries are also disclosed, including methods using the apparatus for treating slurries.

16 Claims, 4 Drawing Sheets

Related U.S. Application Data continuation of application No. PCT/EP2011/059620, filed on Jun. 9, 2011.

(52) U.S. Cl.
CPC ...... *B01F 7/00125* (2013.01); *B01F 7/00141* (2013.01); *B01F 7/00291* (2013.01); *C02F 2303/26* (2013.01)

(56) References Cited

U.S. PATENT DOCUMENTS

| | | |
|---|---|---|
| 6,350,054 B1 | 2/2002 | Lee et al. |
| 6,402,065 B1 | 6/2002 | Higgins |
| 6,443,612 B1 | 9/2002 | Keller |
| 6,523,992 B1 | 2/2003 | Bublewitz et al. |
| 7,320,541 B2 | 1/2008 | Wagner et al. |
| 7,459,506 B2 | 12/2008 | Gebhart et al. |
| 7,708,824 B2 | 5/2010 | Ogata et al. |
| 8,485,716 B2 | 7/2013 | Handa |
| 8,616,025 B2 | 12/2013 | Yamamoto et al. |
| 8,833,688 B2 | 9/2014 | Koop et al. |
| 8,961,000 B2 | 2/2015 | Singer |
| 2002/0190401 A1 | 12/2002 | Sylvester |
| 2003/0178375 A1 | 9/2003 | Sharpe et al. |
| 2007/0125894 A1 | 6/2007 | Koop et al. |
| 2012/0180529 A1 | 7/2012 | Singer |
| 2013/0148466 A1 | 6/2013 | Gramann et al. |

FOREIGN PATENT DOCUMENTS

| | | | |
|---|---|---|---|
| DE | 19613679 A1 | * 10/1997 | ............... B09C 1/00 |
| DE | 19808156 A1 | 9/1999 | |
| DE | 202005000875 U1 | 6/2006 | |
| DE | 102005019010 A1 | 10/2006 | |
| JP | S62-059132 U | 4/1987 | |
| JP | H09-117654 A | 5/1997 | |
| JP | 2002248493 A | 9/2002 | |
| JP | 2004130181 A | 4/2004 | |
| JP | 2009-039683 A | 2/2009 | |
| KR | 20-0447694 Y | 2/2010 | |
| WO | 2011157633 A2 | 12/2011 | |

OTHER PUBLICATIONS

International Patent Application No. PCT/EP2011/059620, International Search Report and Written Opinion dated Feb. 20, 2012, 41 pages (including 19 pages English translation).

* cited by examiner

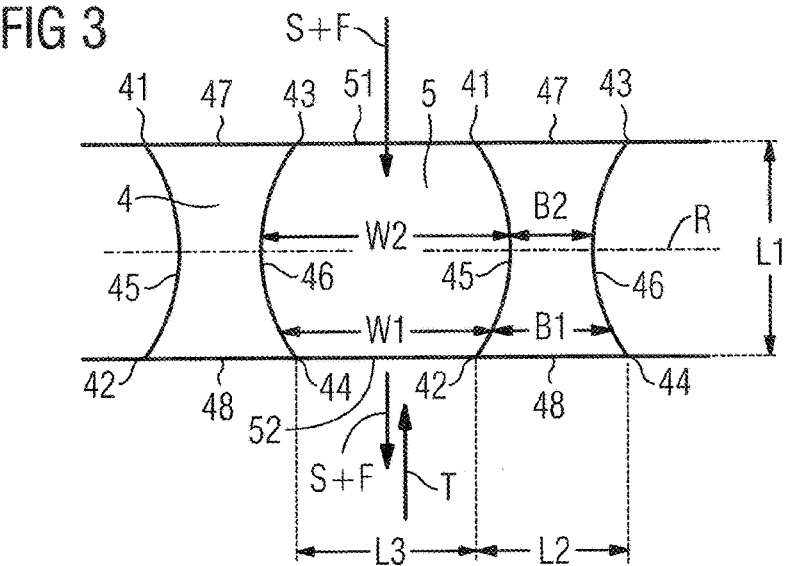
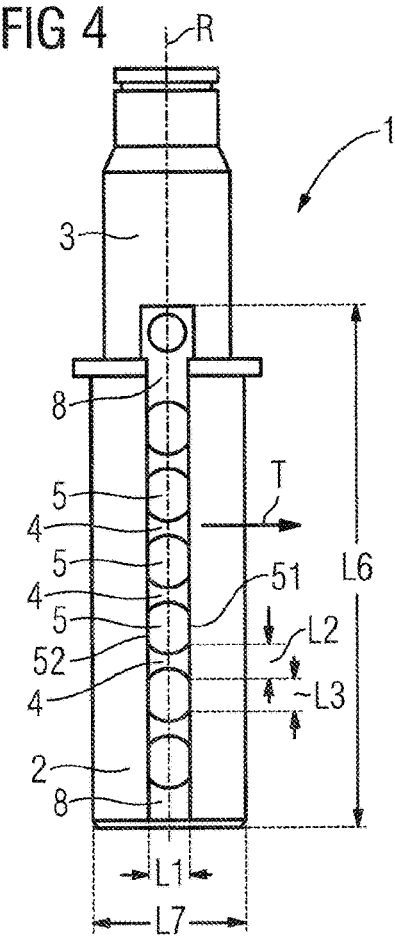
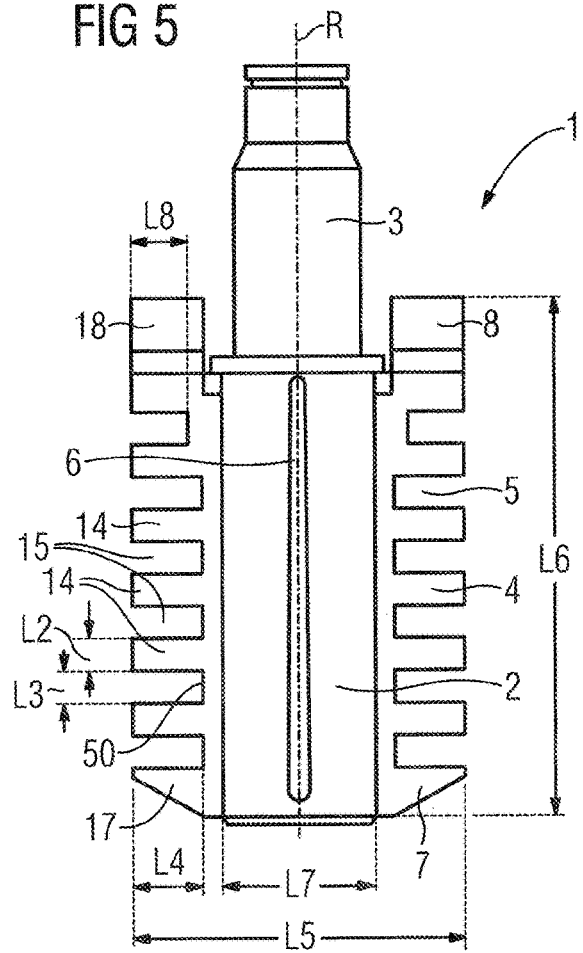

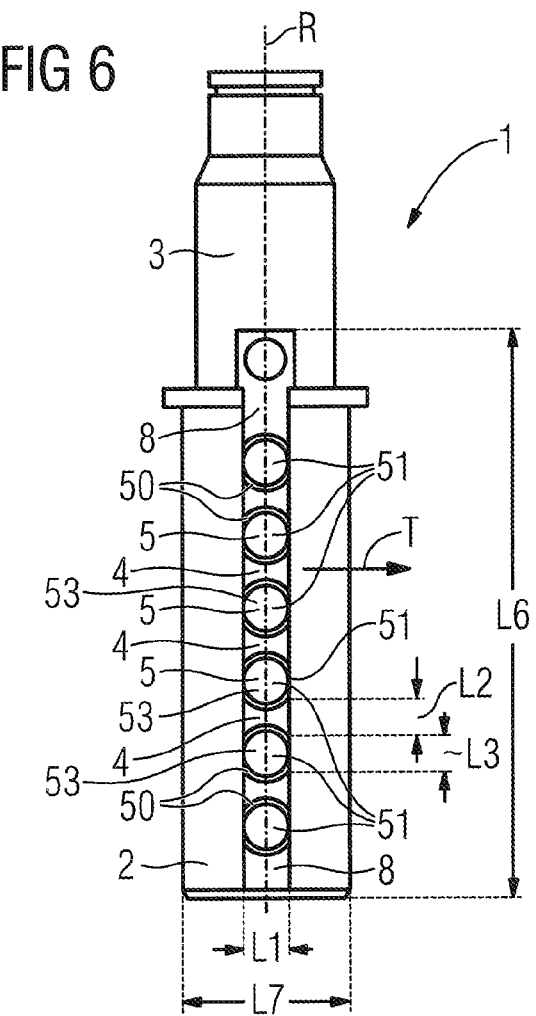

APPARATUS AND METHOD FOR TREATING SLURRIES

CROSS-REFERENCE TO RELATED APPLICATIONS

This application is a Divisional of U.S. patent application Ser. No. 13/715,373, filed Dec. 14, 2012, which is a Continuation of PCT/EP2011/059620, filed on Jun. 9, 2011, which claims priority to German Patent Application Number DE 10 2010 023 793.0, filed Jun. 15, 2010. The entire content of each of the aforementioned patent applications is incorporated herein by reference.

BACKGROUND OF THE INVENTION

1. Field of the Invention

The invention relates to an apparatus and a method in each case for treating slurries, particularly of industrial or biogenic origin.

2. Background and Relevant Art

Such apparatuses and methods are used for the treatment or even renovation of slurries, particularly of slurries of industrial origin, slurries from mining operations, sedimentary slurries in bodies of water and/or biogenic slurries.

Biogenic slurries of animal or human origin are usually mixtures of a liquid phase or liquid, mostly mainly water, and a solid phase or solid particles. The solid phase in this case usually comprises biogenic particles or organic solids, cells and microorganisms, in particular bacteria, and aggregates of these. In addition, biogenic slurries may comprise organic or inorganic substances and also a gas phase, for example in the form of gas bubbles or dissolved gas. The gas may come from the aerobic or anaerobic decomposition of organic material. Biogenic slurries from waste water purification are also designated sewage slurries.

In sewage plants, the waste water or dirty water to be purified usually comes, after mechanical prepurification, into a detritus pit in which undissolved substances, such as faecal substances and paper, etc., settle or float on the surface. Pretreated dirty water is then usually subjected to a biological clarifying stage. In this case, organic substances are decomposed, in particular, aerobically by microorganisms and inorganic substances are partially oxidized. Customary methods for this biological stage are activated sludge methods with subsequent secondary clarification. In the activated sludge method, biogenic contents of the waste water or dirty water are continuously decomposed, with the supply of air, biotically by oxidation and aerobically by the addition of activated sludge which contains bacteria aggregated, for example, in flaky form. During secondary clarification, the activated sludge settles and is thus separated from the waste water. Part of the sludge can be recirculated as what is known as return sludge into the activated sludge method in order to keep the concentration of microorganisms sufficiently high. The excess sludge which has occurred due to the growth of biomass during secondary clarification is thickened, for further treatment, together with the primary sludge from preclarification and is then decomposed further anaerobically, for example, in digestion towers. Digested sludge resulting from this, after passing through a secondary thickener, is delivered to a sludge press for dewatering and, after being dewatered, can be disposed of. Clarification methods may also be carried out without preclarification. In this case, only the excess sludge from secondary clarification is delivered to the sludge press via a prethickener, usually without a digestion tower.

For the dewatering of slurries, in particular sewage or industrial slurries or sedimentary slurries, it is known to separate the slurry liquid fraction, composed essentially of water, by means of a filter plant or centrifuge, solid constituents simultaneously being separated from the slurry. Furthermore, dewatering with bags or hoses made from (geo)textile filter materials is also known.

A flocculent (a flocking aid) which contains polymers is usually mixed with the slurry before dewatering, in order to increase the degree of dewatering or degree of drying of the slurry, that is to say to dewater the slurry more effectively. The way in which the flocculent acts may be imagined as being that the polymers bind the solid particles in the slurry to one another in flakes or so as to form flakes and thereby assist or improve their separation from the water. The dewatered dry mass filtered out is also designated as a filter cake. The polymers also improve the passage of water through the filter cake in the case of the subsequent slurry quantities.

DE 198 08 156 A1 discloses an apparatus for the treatment of conditioning agent (flocculent) for aqueous slurry, with a rotating distributor head for mixing a mixture of active substance parent solution and additional water in a mixing chamber and with an inoculating device which dispenses the active substance solution mixed in the mixing chamber, as conditioning agent, to the aqueous slurry flowing in a feed pipe. The distributor head has, distributed about its axis of rotation, essentially two longitudinal slots running parallel to the axis of rotation, as fluid outlets for the mixture, and also two mixing blades extending radially outward and along the axis of rotation and designed as strips. The longitudinal slots are arranged in the circumferential direction between the mixing blades. The mixture flows through a shank of the distributor head and through the slot shaped fluid outlets outward into the mixing chamber and is fully mixed there by the two mixing blades. The mixing blades have on their outer circumference or region located radially furthest outward, in a first embodiment, mixing-in edges running parallel to the axis of rotation and end edges adjoining these axially at the front and rear and running inward in a curved manner or, in a second embodiment, circular mixing-in edges running in a longitudinal plane containing the axis of rotation. The mixing in edges of the mixing blades swirl and mix the flocculent, introduced via the slots, in the slurry. The rotational speed of the distributor head is set in a range of between 700 rev/min (revolutions per minute) and 2500 rev/min.

The effectiveness of the biological purification stage in sewage plants can be increased in that homogenizers or else disintegrators are used for treating the sewage sludge, in particular the return sludge, primary sludge or excess sludge and also digested sludge.

By means of such disintegrators, the size of the solid particles contained in the sludge can be reduced and homogenized, with the result that a larger effective surface for decomposition becomes available. Furthermore, by disintegration, enzymes adhering to cell walls and biogenic particles can be detached and thus introduced into the liquid phase. Further, in disintegration, cell walls of cells and the like can be at least partially broken up, with the result that endoenzymes of the cells are released. In particular, the disintegration actions mentioned increase the efficiency of biological decomposition by microorganisms in the sludge, in particular in the activated sludge of the biological decomposition stage.

A disintegration rotor for sewage sludges is known, for example, from DE 37 19 441 A1. The known disintegration rotor has twisted blades with a curved front. Rotation of the disintegration rotor in the sludge results in disintegrating cavitation effects.

A disintegration rotor having external blades for sewage sludges is known from JP-2002 248493. When this disintegration rotor rotates, disintegration is brought about by cavitation between the blades.

U.S. Pat. No. 6,402,065 B1 discloses a disintegration rotor with blades arranged parallel to the axis of rotation, in which rotor the sludge flows radially.

DE 20 2005 000 875 U1 discloses a disintegration rotor in which the sludge is routed radially from the inside outward through partially nozzle like cavities.

Disintegration of sludges can admittedly be achieved by means of the known disintegration rotors. However, the achievable disintegration action is still worth improving.

BRIEF SUMMARY OF THE INVENTION

On the basis of this, in particular, an object of the invention is to provide a novel apparatus and a novel method in each case for treating, in particular mixing in conditioning agent and/or disintegrating, slurries.

This object is achieved by means of the features of patent claim 1. Refinements and developments according to the invention may be gathered from the dependent claims.

The apparatus according to patent claim 1 is suitable and intended for the treatment of slurries, particularly of biogenic or industrial origin, and comprises at least one treatment rotor which is arranged or can be arranged in the slurry and which rotates or is rotatable about an axis of rotation running generally through, preferably centrally through, the treatment rotor, and treatment elements which project outward, as seen from the axis of rotation, and between which interspaces are formed, at least some of the treatment elements having, at at least one, preferably each, adjacent interspace, in each case at least one treatment edge, preferably at least two treatment edges spaced apart from one another, each of these treatment edges running from the inside outward, as seen from the axis of rotation. The run of the treatment edges is, in particular, such that the spacing of the points on the treatment edge from the axis of rotation increases along the run or extent of the treatment edge continuously, preferably strictly monotonically. In particular, the run of the treatment edges is radial or linear, but may also be curved or else linear and oblique with respect to the radial direction.

In an advantageous embodiment, the treatment of the slurry is a mixing of conditioning agent, in particular flocculent, into the slurry, the treatment rotor then being designed as a mixing in rotor and the treatment elements of the treatment rotor being designed as mixing in elements and each treatment edge being designed as a mixing in edge.

In a further advantageous embodiment, the treatment of the slurry is disintegration of the slurry, the treatment rotor being designed as a disintegration rotor and the treatment elements of the treatment rotor being designed as disintegration elements and each treatment edge being designed as a disintegration edge.

The embodiments for mixing in conditioning agent and for disintegration may also be combined with one another, in particular in two stage systems or in successive processes.

The invention is based on the idea of providing on a treatment rotor a plurality of treatment elements (or treatment teeth, treatment tenons) which protrude (or project) outward away from the axis of rotation of the treatment rotor or transversely to the axis of rotation and which are separated or spaced apart from one another by interspaces (or gaps), and which, furthermore, have, toward the adjoining or adjacent interspace or adjoining or adjacent interspaces in each case at least two treatment edges running outward in a direction away from the axis of rotation and spaced apart from one another.

This bundle of measures according to the invention synergistically improves the treatment action, in particular mixing in action or disintegration action, of the treatment rotor and increases the introducible treatment energy, in particular mixing energy or decomposition energy for the disintegration of constituents of the slurry, in particular cellular aggregates or cells.

In particular, by the meandering or introduction of spaced apart treatment elements, the effective edge length of the (active) treatment edges is increased and the latter, as swirling edges, considerably increase the mixing of the flocculent in the slurry or the disintegration of the slurry. The interspaces between the treatment elements lead the slurry/conditioning agent mixture or the slurry past the treatment edges during the rotation of the rotor, so that the treatment edges can also act virtually over their entire length upon the mixture or the slurry and introduce treatment energy. Moreover, the rotational speed of the rotor can be reduced because of its higher efficiency and therefore, in general, electrical drive energy can be saved.

In the case of a flocculent as conditioning agent, the mixing energy introduced is in direct correlation to the binding energy during flocculation/flake-formation, so that flocculation can therefore also be improved as a result of measures according to the invention.

Consequently, according to the invention, an entirely novel generation of mixing apparatuses for mixing conditioning agents, in particular flocculants, into slurries is provided, which, because of the enormous increases in efficiency and the energy saving consequently achieved, will technologically supersede the mixing apparatuses existing hitherto. The invention therefore constitutes a technological and economic quantum leap in the sector of flocculation and mixing in technology. A similar statement can be made with regard to application for the disintegration of slurries. The slurries may be any slurries, in particular sewage sludges or industrial slurries.

In advantageous variants according to the invention, the treatment elements or, alternatively or additionally, the interspaces between the treatment elements have a special shape with regard to their cross sections.

The width, measured in the direction parallel to the axis of rotation, of at least some of the treatment elements increases at least partially in the direction of rotation and/or the internal dimension or width, measured in the direction parallel to the axis of rotation, of at least some of the interspaces between the treatment elements decreases at least partially in the direction of rotation. What is achieved thereby is a compression of the slurry/conditioning agent mixture or of the slurry which improves the treatment action as a result of the pressure differences and, where appropriate, cavitation effects which occur.

This increase in the width of the treatment elements or the decrease in the width of the interspaces may be continuous or monotonic or even strictly monotonic in the direction of rotation, so that increasing compression can take place. The inlet orifice of the interspaces is then usually larger than the outlet orifice.

In an especially advantageous embodiment, however, the width, measured in the direction parallel to the axis of rotation, of at least some of the treatment elements, in this embodiment, first decreases in the direction of rotation (or direction of circulation, circumferential direction) and only then increases again, preferably in such a way that the treatment elements have a concavely curved, preferably biconcavely curved configuration. Alternatively or additionally, the internal dimension, measured in the direction parallel to the axis of rotation, of at least some of the interspaces between the treatment elements first increases in the direction of rotation and then decreases again, preferably in such a way that the interspaces are in each case of convexly curved, preferably biconvexly curved form. The variation in the width or internal dimension in the direction of rotation or of circulation is preferably continuous, but, for example, the situation is not ruled out where the width or internal dimension is partially constant.

This variation in the width of the treatment elements or in the internal dimension of the interspaces results, at the treatment elements or in the interspaces between adjacent treatment elements, in an additional decompression and subsequent compression of the slurry/conditioning agent mixture or of the slurry. On the one hand, because of these pressure and flow conditions the flow routing of the slurry/conditioning agent mixture or of the slurry in the interspaces is improved and this mixture or slurry is also swirled at the interspace, at a second treatment edge located behind a front treatment edge in the direction of rotation, and is therefore acted upon successively with mixing energy at at least two treatment edges. On account of this forced flow through the interspace as a result of the geometry of the latter, this gives rise to an additional treatment effect with a further increased introduction of mixing energy. On the other hand, the decompression and subsequent compression of the slurry/conditioning agent mixture lead to additional treatment effects as a result of the pressure differences, amounting to cavitation effects. In this embodiment, the selected configuration and size of the inlet orifice of the interspaces may be the same as those of the outlet orifice, but may also be different.

The selected ratio of a maximum width to a minimum width of the treatment elements is preferably greater than 2, preferably between 2 and 3.5. The selected ratio of a maximum width to a minimum width of the interspaces is preferably greater than 1.4, preferably between 1.5 and 2.8.

Preferably, the conditioning agent is introduced into the slurry between two treatment elements succeeding one another in the direction of rotation, particularly in that the conditioning agent is delivered from a rotor inner space outward through perforations or orifices in the rotor which lie between the treatment elements. However, the conditioning agent may also, alternatively or additionally, be introduced into the interspaces directly through outlet orifices in the rotor which are arranged between the treatment elements provided to the respective interspace and which issue directly into the interspaces.

The treatment rotor proves to be especially effective when, during its rotation about the axis of rotation, it dips completely into the slurry or is surrounded by this.

The treatment edges are preferably arranged at or in marginal regions of the interspaces which form inlet orifices or outlet orifices of the interspaces for the mixture of slurry and conditioning agent. Since the flow cross sections of the interspaces are additionally smallest at these marginal regions, the flow velocity is highest there and therefore swirling at the treatment edges is also optimized.

In an especially advantageous embodiment, two treatment edges of two different treatment elements adjacent to the same interspace lie opposite one another, with the result that the mixture is swirled and acted upon with mixing energy especially strongly between the two mixing in edges acting virtually simultaneously or jointly.

Preferably, two front treatment edges at the inlet orifice of the interspace lie opposite one another and two rear treatment edges at the outlet orifice of the interspace lie opposite one another. As a result, in each case two treatment edges can act directly from both sides or jointly upon the mixture at the narrowest locations, specifically first during the inlet of the latter into the interspace and then during its outlet from the interspace.

These measures lead to further improved treatment efficiency.

In a special structural refinement, at least two treatment edges of a treatment element are connected by means of a flat side, in particular two treatment edges are connected by means of a first flat side and two further treatment edges by means of a further second flat side preferably parallel to the first flat side. Furthermore, preferably, treatment edges lying opposite one another are connected to one another on the two flat sides via concavely curved side walls which form lateral boundary walls of the interspaces. The side walls are preferably designed to be mirror symmetrical with respect to at least one plane of symmetry, preferably with respect to a plane of symmetry lying in the middle between the two flat sides and parallel to these and/or with respect to a plane of symmetry lying in the middle between two treatment edges and orthogonal to the flat sides.

Furthermore, a (radially external) outer face, connecting the end points of the treatment edges, of the treatment element may be designed as a flat side and/or an inner (radially internal) boundary wall of the interspace may be designed as a flat side. The length of the treatment elements or of the treatment edges is generally greater than the clear width of the interspaces, in particular preferably at least 1.5 times to 3 times greater.

In general, the treatment rotor has a rotor basic body on which the treatment elements are fastened or integrally formed. The rotor basic body is preferably internally hollow with an inner space which is enclosed by a preferably essentially hollow cylindrical wall.

Preferably, at least one perforation in the wall is provided, via which the inner space of the rotor basic body is flow connected to the outside space, so that conditioning agent flowing in or through the inner space is introducible or can be introduced through the at least one perforation into the slurry located in the outside space. At least one perforation may be designed as an axial slot running essentially parallel to the axis of rotation.

It is especially advantageous if the perforation or perforations is or are arranged between treatment elements, as seen in the direction of rotation, and/or in each case at least one perforation is arranged in each case between two treatment elements, as seen in the direction of rotation. The perforations are preferably arranged so as to be offset to one another in the direction of rotation, preferably distributed equidistantly, in particular so as to be offset in pairs to one another by about 180° and/or offset in each case by about 90° to the treatment elements preferably offset by 180°.

The treatment rotor has in general a coupling element which adjoins the rotor basic body axially with respect to the axis of rotation and via which the treatment rotor can be coupled to a preferably varied speed or variable speed rotary drive, in particular a rotary shaft of the rotary drive, for the purpose of rotating the treatment rotor about the axis of rotation.

According to an advantageous refinement, a plurality of treatment elements of the treatment rotor are arranged so as to be offset in a direction parallel to the axis of rotation, in particular in at least one row, preferably in at least two rows, preferably the or each row running parallel to the axis of rotation or else helically about the axis of rotation. Furthermore, preferably, at least two treatment elements are arranged on a circle about the axis of rotation or in the same axial position along the axis of rotation and are offset to one another by a spacing angle, preferably these at least two treatment elements being arranged in a paired rotationally symmetrical arrangement or at identical spacing angles to one another and/or the rows of pluralities of treatment elements being arranged at equal spacing angles to one another or with rotational speed symmetry.

Furthermore, in general, at least some, preferably all, of the treatment elements are spaced apart from one another on the outside facing away from the axis of rotation and/or the interspaces between these treatment elements are designed to be outwardly open on their outside facing away from the axis of rotation. In such a version, the interspaces can be kept free of blockages more easily, without appreciable decreases in efficiency having to be accepted.

Alternatively, however, at least some of the treatment elements, in particular the treatment elements in each case in a row or line, may also be connected to one another, on the outside facing away from the axis of rotation, by means of an outer region of the treatment rotor, and/or the interspaces between these treatment elements may be closed off on their outside facing away from the axis of rotation.

To avoid unbalances in the treatment rotor, it is advantageous if the treatment rotor, in particular its treatment elements, are arranged and designed in such a way that the mass center of gravity of the rotor lies on the axis of rotation or the axis of rotation is a main axis of inertia (characteristic axis) of the rotor. For example, in each case the same number of treatment elements may be arranged on opposite sides or lines of the treatment rotor. This also includes arranging the treatment elements in a paired rotationally symmetrical, mirror symmetrical or point symmetrical arrangement.

A further embodiment of the invention relates to an apparatus for treating slurry, in particular biogenic slurry, which comprises at least one treatment apparatus according to the invention and comprises at least one liquid extraction device following or subsequent in the direction of flow of the slurry, in particular dewatering device, in particular filter press or centrifuge, or textile dewatering hoses or bags, for the purpose of reducing the liquid content, in particular water content, of the slurry.

The axis of rotation of the treatment rotor is preferably directed transversely, preferably perpendicularly, to the direction of transport of the slurry which is routed, in particular, through a transport line.

A further aspect of the invention relates to a method for mixing conditioning agent, in particular flocculent, into a slurry, an apparatus as claimed in one of the preceding claims being used, and the treatment rotor being surrounded essentially completely, but at least with its treatment elements, by the slurry or being arranged or dipped in the slurry.

The conditioning agent, in particular flocculent, added to the slurry preferably promotes or intensifies the separation of the liquid phase or liquid, in particular water, from solids, including solid fractions of cells of organic origin contained in the slurry, of the slurry. In particular, flaky structures of different size are formed from solid particles and/or solid cellular constituents of the slurry and flocculent and liquid, in particular water, is released from the slurry.

A further aspect of the invention relates to a method for the disintegration of slurries, an apparatus according to the invention being used and the treatment rotor being surrounded essentially completely, but at least with its treatment elements, by the slurry or being arranged or dipped in the slurry and being rotated about its axis of rotation.

BRIEF DESCRIPTION OF THE DRAWINGS

Exemplary embodiments of the invention are described in more detail below by means of figures in which:

FIG. 3 shows two treatment elements with an interspace in longitudinal section, FIG. 4 shows a side view of the treatment rotor according to FIG. 1, FIG. 5 shows a top view of the treatment rotor according to FIG. 1, FIG. 6 shows a further embodiment of a treatment rotor in a side view.

DETAILED DESCRIPTION OF THE PREFERRED EMBODIMENTS

In FIGS. 1 to 8, identical or functionally identical elements are designated by the same reference symbols. The refinements described in connection with the figures (fig.) are described only in as much as is necessary for understanding the invention. Furthermore, the figures are not necessarily true to scale and scales may vary between the figures.

FIGS. 1 to 5 show a first exemplary embodiment of a treatment rotor 1 and parts of it, and FIG. 6 shows a second exemplary embodiment of a treatment rotor.

Figure 7:
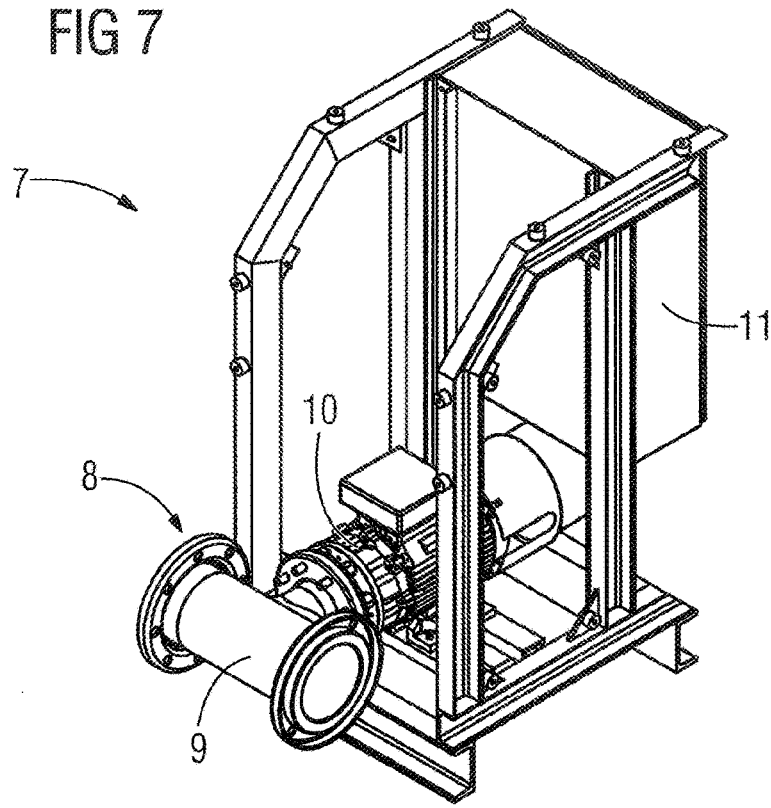
FIG. 7 shows a perspective view of an apparatus for mixing a conditioning agent, in particular flocculent, into a slurry.
Figure 8:
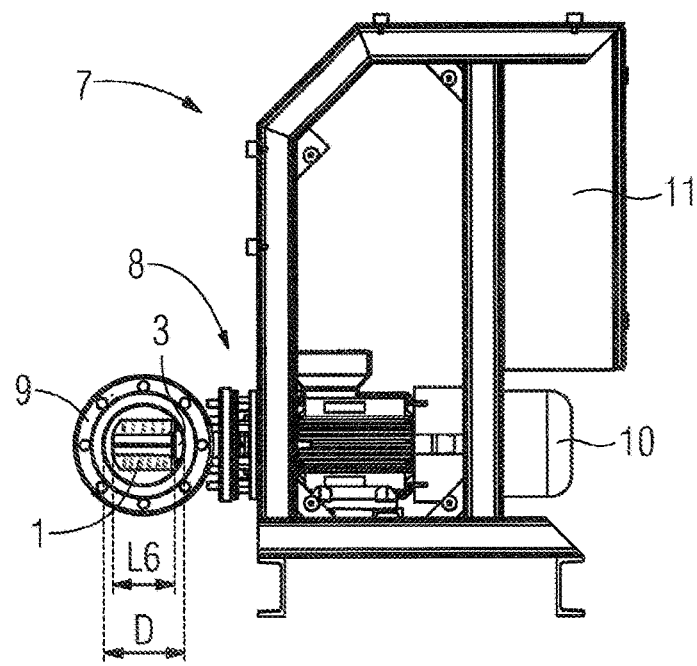
FIG. 8 shows a side view of the apparatus according to FIG. 7.

FIGS. 7 and 8 show an apparatus 7 for treating slurry S, in particular biogenic slurry (or, if appropriate, also a mixture of slurry S and flocculent F), in particular for mixing in flocculent F or for the disintegration of slurry S. The treatment rotor 1 is mounted rotatably in a T shaped portion of an only partially illustrated transport or feed line 9 for the slurry S. The treatment rotor 1 projects into the interior of the feed line 9.

The treatment rotor 1 has an internally hollow rotor basic body 2 with an inner space 20, which is enclosed by an essentially hollow cylindrical wall 21, and a plurality of treatment elements 4 and 14 fastened or integrally formed on the rotor basic body 2 and projecting or protruding outward, in particular in a direction radial to the axis of rotation R.

Figure 1:
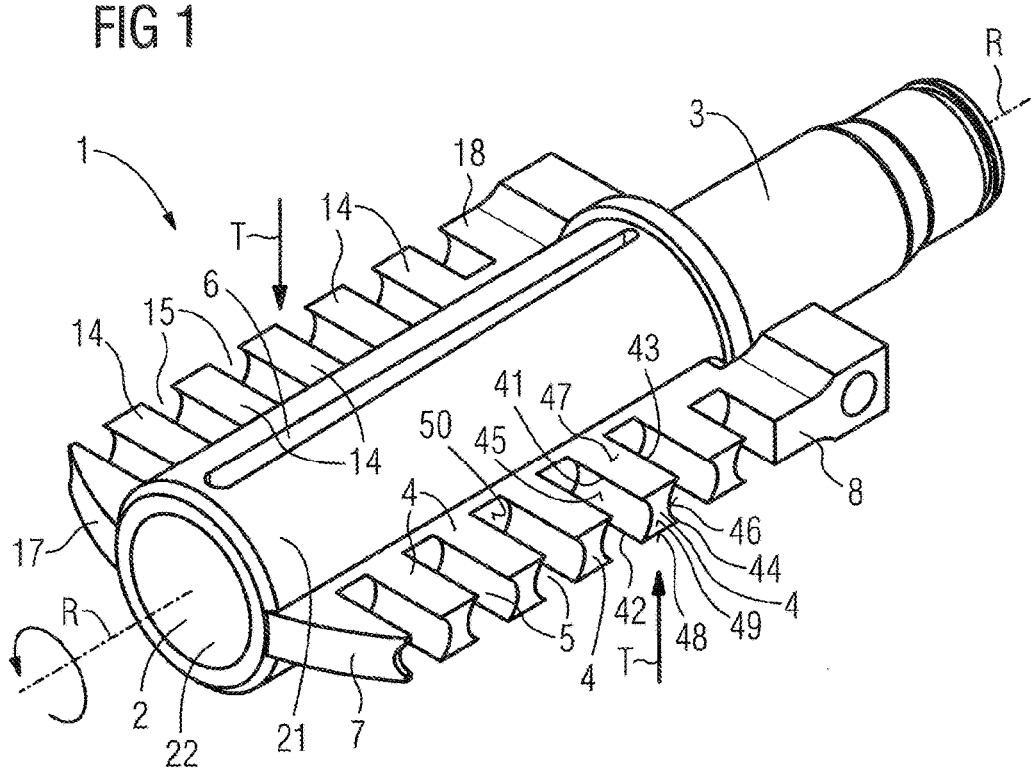
FIG. 1 shows a perspective illustration of a treatment rotor.

The treatment rotor 1 is rotatable about an axis of rotation R running centrally through the treatment rotor 1 and for this purpose has a coupling element (connecting shaft) 3 which adjoins the rotor basic body 2 axially with respect to the axis of rotation R and via which the treatment rotor 1 can be connected or coupled to a rotary drive (10 in FIGS. 6 and 7), not illustrated in FIG. 1, for the purpose of rotating the treatment rotor 1 about the axis of rotation R. The direction of rotation of the rotary movement of the treatment rotor 1 is designated by T and, in general, is a direction tangential to a circle about the axis of rotation R or a direction running along a circle about the axis of rotation R and continuously following the circle curvature. In the example of FIG. 1, the direction of rotation T selected is clockwise, but may also be directed oppositely or counterclockwise or even be changed regularly to prevent clogging of the treatment rotor 1.

The treatment elements 4 and 14 are designed, in particular, as treatment tenons or treatment teeth. In the exemplary embodiment illustrated, the treatment rotor 1 has, on opposite sides, so as to be offset by about 180°, two rectilinear rows, running parallel to the axis of rotation R, of in each case, for example, five treatment elements 4 on one side and 14 on the other side, which are configured essentially identically to one another.

For mixing conditioning agent, in particular flocculent F, into a slurry S, the treatment rotor 1 is designed as a mixing in rotor and its treatment elements as mixing in elements and their treatment edges as mixing in edges. Such an application is preferably described here.

For the disintegration of a slurry S (or, if appropriate, of a mixture of slurry S and flocculent F), the treatment rotor 1 is designed as a disintegration rotor and its treatment elements are designed as disintegration elements and their treatment edges as disintegration edges.

Figure 2:
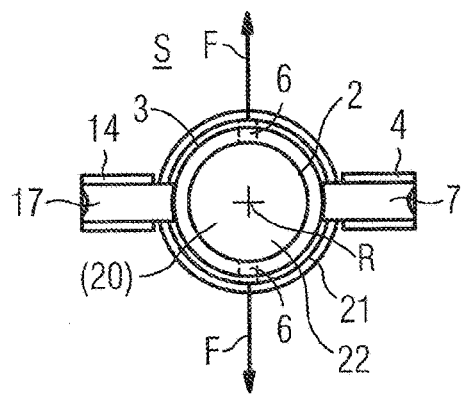
FIG. 2 shows a cross section of the treatment rotor of FIG. 1 along a sectional plane directed perpendicularly to the axis of rotation.

In each case perforations 6 are provided in the wall 21 between the treatment elements 4, on the one hand, and the treatment elements 14, on the other hand, as seen in the circumferential direction or direction of rotation T, and, as can be seen in FIGS. 1, 2 and 5, are designed as axial slots running parallel to the axis of rotation R, but may also be configured or arranged differently or be varied in number. The perforations 6 are likewise offset to one another by about 180° and to the treatment elements 4 and 14 in each case by about 90°. The inner space 20 of the rotor basic body 2 is flow connected to the outside space by means of the perforations 6.

In FIG. 6, additional outlet orifices 55 are provided in the boundary walls 50 between the treatment elements 4 and 14, as seen axially, issue directly into the interspaces 5 and 15 and likewise connect the inner space 20 of the rotor basic body 2 to the outside space.

The treatment elements 4 are spaced apart or separated from one another by interspaces 5 and the treatment elements 14 by interspaces 15. However, more than two such rows of spaced apart treatment elements may also be provided.

The treatment elements 4 and 14 all project outward essentially radially to the axis of rotation R and have in each case four preferably rectilinear treatment edges 41, 42, 43 and 44 which run outward parallel to a radial direction, perpendicular to the axis of rotation R, essentially perpendicularly to the direction of rotation T and parallel to one another and which have essentially the same length L4.

As can best be seen in FIG. 3, in each case two treatment edges 41 and 42 of a treatment element 4 and 43 and 44 of an adjacent treatment element are adjacent to the interspace 5 lying between them, and preferably two opposite treatment edges 41 and 43 of the adjacent treatment elements 4 lie at an inlet orifice 51 of the interspace 5 and two opposite treatment edges 42 and 44 of the adjacent treatment elements 4 lie at an outlet orifice 52 of the interspace 5. Thus, the two treatment edges 41 and 42, adjacent to the interspace 5, of one treatment element 4 are spaced apart from one another and the treatment edges 43 and 44 of the other treatment element 4 are likewise spaced apart from one another by the amount of the spacing between the inlet orifice 51 and outlet orifice 52 or the dimension L1, measured in the direction of rotation T, of the interspace 5. The same also applies correspondingly to the treatment elements 14 and the interspaces 15.

As illustrated, the inlet orifice 51 and the outlet orifice 52 may be of equal size or have an equally large (flow) cross-sectional area, preferably even the same configuration, but may also be different.

The two treatment edges 41 and 43 are connected by means of a flat side 47 of the treatment element 4 and 14, while a further flat side 48, parallel to the flat side 47, of the treatment element 4 and 14 lies between the treatment edges 42 and 44.

By contrast, the opposite treatment edges 41 and 42 and also 43 and 44 on the two flat sides 47 and 48 are connected to one another via concavely, that is to say inwardly, curved side walls 45 and 46 which therefore also form the lateral boundary walls of the interspaces 5 and 15, which boundary walls are therefore curved convexly, that is to say outwardly, from the point of view of the interspaces 5 and 15. The configuration of the side walls 45 and 46 is in each case, in particular, mirror symmetrical with respect to a plane of symmetry lying in the middle between the two flat sides 47 and 48 and parallel to these, for example cylindrical. Furthermore, preferably, the two side walls 45 and 46 are also mirror symmetrical to one another with respect to a plane of symmetry located in the middle between the two treatment edges 41 and 43 and orthogonal to the flat sides 47 and 48.

Consequently, in more general terms, the axial width, measured parallel to the axis of rotation R or perpendicularly to the direction of rotation T, of the treatment elements 4 and 14 decreases from a maximum width L2 at the front on the flat side 47 first inward, as far as the middle of the treatment element 4 or 14, to a minimum width and then increases again at the rear on the flat side 48 to a maximum width L2. Complementarily to this, the axial width, measured parallel to the axis of rotation R or in the direction of rotation T, of the interspaces 5 and 15 increases from a minimum width L3 at the front first inward, as far as the middle of the interspace 5 or 15, to a maximum width and then decreases again rearward on the outside to a minimum width L3. This can be seen especially clearly in FIG. 3, where, for example, a greater width B1 of the treatment element 4 with an associated smaller width W1 of the interspace 5 and a smaller width B2 of the treatment element 4 further inward with an associated greater width W2 of the interspace 5 are illustrated. This (more general) teaching for the configuration of the treatment elements or interspaces can also be implemented by other versions, apart from those illustrated in FIGS. 1 to 5, for example by another configuration of their cross sections with differently curved and/or even asymmetric side walls 45 and 46 and other axial widths. For example, only one side wall 45 or 46 may also be concave and the other planar or even convex.

The outer face, connecting the end points of the treatment edges 41 to 44, of the treatment elements 4 and 14 is designated by 49 and is preferably designed as a flat side. The inner boundary walls of the interspaces 5 and 15 are designated by 50 and are preferably likewise of flat form.

On the end face in front of the row of treatment elements 4 or 14, further outwardly projecting treatment elements 7 and 17 configured identically to one another are in each case arranged so as to be spaced from the adjacent first treatment element 4 or 14, but are curved rearward on the end face so that the treatment rotor 1 can more easily be fitted transversely into a pipe cross section of the flow pipe for the slurry S. By its shape being sloped or curved at the front, the treatment rotor 1 can be adapted to the curved inner walls of the tubular transport or feed line 9 and can be introduced as far as possible into the feed line 9 transversely to the longitudinal direction of the latter, that is to say to the direction of transport of the slurry S, without the treatment elements butting against the inner walls or touching these during the rotation of the treatment rotor 1.

Further shapes suitable for this purpose may also be envisaged for the treatment elements or the treatment rotor 1. For example, the radial length L4 of the treatment elements 4 and 14 may also vary according to the respective shape of the feed line. Furthermore, it is not necessary, as in the present exemplary embodiment, for the treatment elements 4 and 14 to have essentially the same shape.

At the rear ends of the two rows of treatment elements 4 and 14 there is, in each case spaced apart from the adjacent last treatment element 4 and 14, a fastening element 8 or 18 for the fastening of the treatment rotor 1 to a corotating part of a floating ring seal, not illustrated.

The depth of the interspaces 5 and 15 corresponds to the length L4 of the treatment edges 41 to 44. The interspace between a fastening element 8 or 18 and a treatment element 4 or 14 is less deep, with the depth L8, for stability reasons.

The treatment elements 4 and 14 and also 7 and 17 preferably lie in pairs at the same axial positions along the axis of rotation R, as do the fastening elements 8 and 18. This is achieved, in particular, in an embodiment in which the treatment rotor 1 has symmetry with respect to rotation through 180°. In an embodiment with three or four or, in general, n rows of treatment elements, instead of only two, this rotational speed symmetry must then be in terms of 120° or 90° or, in general, 360°/n.

The overall length of the two lateral rows of treatment elements 17 and 4 or 7 and 14, on the one hand, and the fastening element 8 or 18 is designated by L6. The outside diameter of the treatment rotor 1 between the outsides of the two rows, corresponding to the outer faces 49 of the treatment elements 4 and 14, is designated by L5. The diameter of the basic body 2, that is to say its (maximum) dimension perpendicularly to the axis of rotation R, is designated by L7.

The dimensions L1 to L7 may, without any restriction in generality, be selected as follows: L1 between 6 mm and 28 mm, L2 between 3 mm and 17 mm, L3 between 2 mm and 14 mm, L4 between 12 mm and 220 mm, L5 between 80 mm and 510 mm, L6 between 88 mm and 530 mm and L7 between 21 mm and 270 mm.

The functioning of the treatment rotor 1 may be described as follows:

During the rotation of the treatment rotor 1, for mixing flocculent F into a slurry S, a flocculent F routed or flowing through the inner space 20 is introduced, as can best be seen in FIG. 2, through the perforations 6 essentially radially away from the axis of rotation R outward into the slurry S located in the outside space. The mix or mixture of slurry S and flocculent F is designated by S+F.

The flocculent F serves in a way known per se and already described above for conditioning the slurry S, in particular for improving the efficiency of a subsequent mechanical liquid extraction, in particular dewatering, in particular by means of a press or centrifuge or a water-permeable textile bag or the like.

The flocculent F introduced into the slurry S via the perforations 6 is then mixed into the slurry S further and with a higher degree of treatment by the in each case next and, if appropriate, following treatment element or treatment elements 4 or 14, while at the same time treatment energy is introduced.

In this case, during the rotation of the treatment rotor 1 in the slurry S, the slurry/flocculent mixture S+F is pressed or routed in a flow direction opposite to the direction of rotation T through the interspaces 5 between the treatment elements 4 (or interspaces 15 between the treatment elements 14), as can be seen clearly in FIG. 3. The mixture S+F passes through the inlet orifice 51, which lies between the treatment edges 41 and 43, at the front in the direction of rotation T, of the adjacent treatment elements 4, into the interspace 5 and the same current flows past these front treatment edges 41 and 43. The front treatment edges 41 and 43 work or act as swirling and stalling edges for the flow of slurry/flocculent mixture S+F. The mixture, however, is not pressed or thrown outward on account of the centrifugal forces, but instead, in the case of the treatment rotor 1 according to the invention, necessarily remains initially on the treatment rotor 1.

To emphasize, the mixture S+F of slurry S and flocculent F is pressed or routed through the interspace 5 and flows out of the interspace 5 again only at the outlet orifice 52. As a result, the mixture S+F also flows in forced flow past the second pair of opposite treatment edges 42 and 44 at the outlet orifice 52 and is acted upon anew with mixing energy by these and swirled.

As compared with the prior art, therefore, according to a first effect of the invention, the number of active treatment edges or treatment edges acting upon the same volume fraction of slurry/flocculent mixture S+F is increased by four, to be precise the four treatment edges 41 to 44, adjacent to the interspace 5 (or 15), of the adjacent treatment elements 4 (or 14).

As compared with a treatment rotor having a treatment edge which is axially continuous on the outside, an active edge length of the treatment edges or swirling edges of 4 L4 per interspace 5 or 15 and 4 L8 in the case of the last two interspaces is obtained. During the treatment rotor 1 illustrated, therefore, the overall edge length will be 40 L4+8 L8. For example with L4=20 mm and L8=16 mm, a swirling edge length of 928 mm is therefore obtained.

This increased number or length of treatment edges according to the invention results in a considerable improvement in the treatment result or in the introduction of mixing energy.

A second effect which brings about an improved treatment result arises from the variation in the flow cross section of the interspace 5 (or 15) for the mixture S+F flowing through. Since the cross section of the interspace 5 (or 15) initially increases in the flow direction, the mixture S+F is first decompressed, that is to say the static pressure is reduced on account of the higher dynamic pressure, and is subsequently compressed since the cross section of the interspace 5 (or 15) thereafter decreases again. If the inlet orifice 51 and outlet orifice 52 have essentially the same flow cross section, the static pressures upon the inlet and upon the outlet of the mixture S+F into and out of the interspace 5 (or 15) are also essentially identical.

As a result of this decompression and subsequent compression of the slurry/flocculent mixture S+F, as compared with conventional treatment rotors additional mixing in effects arise which lead to improved mixing of the flocculent F into the slurry S.

On the one hand, initially in conjunction with the first effect due to the pressure profile inside the interspaces 5 (15), the mixture S+F is sucked properly into the interspaces 5 (15) and does not deviate outward even before the rear treatment edges 42 and 44, but instead also flows almost completely over the rear treatment edges 42 and 44 upon outlet from the interspaces 5 (15). The same volume element of the slurry/flocculent mixture S+F is therefore led both past the front treatment edges 41 and 43 and past the rear treatment edges 42 and 44 and further swirled and intermixed.

However, the second effect mentioned is caused by the pressure differences themselves which, even from a certain size, may bring about, in the same way as in a cavitation nozzle, cavitation effects which improve the mixing of the mixture S+F even while it flows inside the interspace 5 (15) between the treatment edges.

Finally, in an embodiment which is not illustrated, it is also possible that, in the direction of rotation T, the axial width of the treatment elements 4 and 14 increases from a minimum width B2 at the front on the flat side 47 to a maximum width B1 at the rear on the flat side 48 and correspondingly, in the direction of rotation T, the axial width of the interspaces 5 and 15 decreases from a maximum width W2 at the front to a minimum width W1 at the rear. In this embodiment, therefore, the inlet orifice 51 of the interspaces 5 and 15 is always larger than the outlet orifice 52 of the interspaces 5 and 15. In this embodiment, the slurry/flocculent mixture S+F is thus only compressed, not first decompressed, on its way through the interspaces between the treatment elements. In this embodiment, too, good full mixing results are achieved. Particularly in this embodiment, but also in all the others, treatment edges may also be provided at the outlet orifice 52 only, whereas obtuse or curved and/or funnel-shaped inflow regions may also be provided at the inlet orifice.

The selected ratio B1/B2 of the maximum axial width B1 to the minimum width B2 of the treatment elements 4 and 14 is preferably greater than 2, preferably between 2 and 3.5. The selected ratio W2/W1 of the maximum axial width W2 to the minimum width W1 of the interspaces 5 and 15 is preferably greater than 1.4, preferably between 1.5 and 2.8. These ratios B1/B2 or W2/W1 are a measure of the relative decrease or increase in the axial width of the treatment elements or in the axial width of the interspaces between the treatment elements and therefore also determine the degree of compression (or, if appropriate, decompression) of the slurry/flocculent mixture S+F.

Finally, in a further embodiment which is not illustrated, it is also possible not to vary the width of the treatment elements 4 and 14 or the width of the interspaces, that is to say to keep them constant in the direction of rotation T.

In a further embodiment, not illustrated, the interspaces 5 and 15 may also be closed off radially outward in order to prevent the slurry/flocculent mixture S+F from being forced out due to the centrifugal forces. For example, a bar-shaped or rod-shaped longitudinal part which runs axially to the axis of rotation R and closes all the interspaces 5 and 15 may be arranged on the outside over the comb-like structure of each row of treatment elements 4 and 14. This gives rise to a ladder-like structure instead of a comb-like structure. The longitudinal part, too, may again have treatment edges, in particular axially running treatment edges, on the outside and, in particular, be designed as a square or square tube which is applied, for example by welding, from outside to the outer faces of the treatment elements.

Furthermore, in all the embodiments, a reversing function or reversing operation for the purpose of cleaning the interspaces 5 and 15 may be provided, in which the rotor is rotated in an opposite direction to the direction of rotation T provided in mixing operation, above all in order to remove larger particles from the interspaces.

The treatment edges 41 to 44 are preferably of sharp-edged form in order to achieve good swirling. In a further embodiment, the surface of the treatment rotor 1 may be provided, at least at the treatment edges, with a wear protection layer, for example a layer produced by plasma nitriding or a ceramic coating, in particular an aluminum oxide layer, for example by spraying on, or else a hard material layer, for example a TiN or TiCN layer.

The treatment elements 4 and 14 may be connected in one piece to one another and/or to the basic body or else be plugged as prefabricated parts into orifices in the basic body and be introduced into the inner space and then fastened by means of screws and/or crossbeams.

According to FIGS. 7 and 8, to rotate the treatment rotor 1 in the feed line 9, said rotor is coupled, for example nonpositively, to a motor 10 via the coupling element 3. During operation, slurry S is pumped or routed through the feed line 9 while the treatment rotor 1 is rotated by the motor 10. At the same time, flocculent is delivered through the treatment rotor 1. In this case, the treatment rotor 1 is preferably surrounded completely by slurry S, this being especially advantageous in terms of treatment efficiency.

It is advantageous if the cross-sectional area which is occupied by the treatment rotor 1 and which corresponds, particularly in the exemplary embodiment illustrated, to the product L5L6 is greater than 50% and smaller than 74% of the flow cross-sectional area of that feed line portion of the feed line 9 in which the treatment rotor 1 is arranged.

Sealing elements may also be provided in the region of the coupling element 3 in order to seal off the coupling element 3 with respect to the feed line 9 against the passage of slurry S or liquid. A check unit for the motor 10 and for the feed pump or feed pumps, not illustrated, for the flocculent F and preferably also the slurry S is designated by 11. The rotational speed of the treatment rotor 1 may advantageously be selected between 1200 and 4000 rev/min., and the slurry volume flow in the feed line 9 may typically amount to 3 to 400 $m^3$ per hour.

The apparatus illustrated in FIGS. 7 and 8 may have further treatment rotors 1 which precede or follow the treatment rotor 1 shown or else are connected in parallel and which may be incorporated into the feed line 9 in a similar way to that described above. The apparatus 7 may, furthermore, be followed in the flow direction or transport direction of the slurry S by a mechanical drying device, not shown, in particular a filter press or centrifuge, for drying or dewatering the slurry S, the flocculent F largely remaining in the separated water or liquid.

The apparatus illustrated in FIGS. 7 and 8 may also have further treatment rotors 1 which precede or follow the treatment rotor 1 shown or else are connected in parallel and which may be incorporated into the feed line 9 in a similar way to that described above.

In the disintegration of slurry S, the slurry/flocculent mixture S+F must be replaced, as described, by the slurry S, while the operating mode and design of the treatment rotor 1 may remain essentially the same. The disintegration action, too, is greatly improved, in a similar way to the mixing in action, by the configuration of the treatment rotor according to the invention, in particular the swirling and compression and decompression effects described. The perforations 6 may serve here for the passage of slurry S or may even be dispensed with entirely.

LIST OF REFERENCE SYMBOLS

- 1 Treatment rotor
- 2 Rotor basic body
- 3 Coupling element
- 4 Treatment element
- 5 Interspace
- 6 Perforation
- 7 Treatment element
- 8 Fastening element
- 9 Transport or feed line
- 10 Motor
- 11 Check unit
- 14 Treatment element
- 15 Interspace
- 17 Treatment element
- 18 Fastening element
- 20 Inner space
- 21 Wall
- 41 to 44 Treatment edge
- 45, 46 Side wall
- 47, 48 Flat side
- 49 Outer face
- 50 Boundary wall
- 51 Inlet orifice
- 52 Outlet orifice
- 53 Outlet orifices
- R Axis of rotation
- T Direction of rotation
- B1 First axial width
- B2 Second axial width
- D Inside diameter
- L1 to L8 Dimension
- F Flocculent
- S Slurry

The invention claimed is:

1. A method for mixing a conditioning agent into a slurry, the method comprising the steps of:
   placing a treatment rotor rotatable about an axis of rotation into the slurry, the treatment rotor having first and second treatment elements projecting outward from the axis of rotation, the first and second treatment elements defining an interspace between the first and second treatment elements;
   introducing the conditioning agent from the treatment rotor into the slurry;
   rotating the treatment rotor about the axis of rotation; and
   directing the slurry and the conditioning agent into the interspace via the rotation of the treatment rotor, wherein the slurry and the conditioning agent are first directed along a first region of the interspace increasing in width and subsequently directed along a second region of the interspace decreasing in width, the width of the interspace measured in a direction parallel to the axis of rotation, and wherein directing the slurry and the conditioning agent along the first region and then the second region intensifies mixing of the conditioning agent into the slurry.

2. The method of claim 1, further comprising separating a liquid from solids in the slurry, including solid fractions of cells of organic origin contained in the slurry, subsequent to the introduction of the conditioning agent.

3. The method of claim 1, further comprising forming flaky structures of differing sizes from solids in the slurry subsequent to the introduction of the conditioning agent.

4. The method of claim 1, further comprising releasing solid cellular constituents of the slurry subsequent to the introduction of the conditioning agent.

5. The method of claim 1, wherein directing the slurry and the conditioning agent into the interspace while the treatment rotor is rotated comprises directing the slurry and the conditioning agent into the interspace having a ratio of a maximum width to a minimum width between 1.5 and 2.8.

6. The method of claim 1, wherein the conditioning agent is introduced from the treatment rotor into the slurry at a slot defined by a body of the treatment rotor at a location outside of the interspace.

7. The method of claim 1, further comprising disintegrating the slurry by rotating the treatment rotor about the axis of rotation prior to introduction of the conditioning agent.

8. A method for treating a slurry using an apparatus, the method comprising the steps of:
   placing a treatment rotor of the apparatus into the slurry, wherein the treatment rotor is rotatable about an axis of rotation, and wherein placing the treatment rotor into the slurry comprises placing into the slurry first and second treatment elements projecting outward from the axis of rotation, the first and second treatment elements defining an interspace therebetween;
   rotating the treatment rotor about the axis of rotation;
   decompressing the slurry within the interspace via the rotation of the treatment rotor about the axis of rotation; and
   compressing the slurry within the interspace via the rotation of the treatment rotor about the axis of rotation, the compressing being subsequent to the decompressing wherein decompressing the slurry within the interspace occurs along a first location within the interspace where a width of the interspace, measured in a direction parallel to the axis of rotation, increases in a direction of rotation about the axis of rotation and the compressing the slurry within the interspace occurs along a second location within the interspace where a width of the interspace, measured in the direction parallel to the axis of rotation, decreases in the direction of rotation about the axis of rotation.

9. The method of claim 8, further comprising the step of: introducing a conditioning agent into the slurry.

10. The method of claim 9, wherein the conditioning agent is introduced into the slurry from an axial slot defined by a body of the treatment rotor on which the first and second treatment elements are formed, the axial slot running substantially parallel to the axis of rotation along at least a portion of the body.

11. The method of claim 10, wherein the axial slot is defined by the body at a location between first and second rows of treatment elements.

12. The method of claim 9, further comprising the step of: separating a liquid from solids in the slurry subsequent to introducing the conditioning agent into the slurry.

13. The method of claim 8, wherein the first and second treatment elements define the interspace to be of a convexly curved form.

14. The method of claim 8, wherein placing into the slurry the first and second treatment elements comprises placing a first row of treatment elements including the first and second treatment elements into the slurry and placing a second row of treatment elements into the slurry, the first and second rows offset from one another by approximately 180 degrees relative to the axis of rotation.

15. The method claim 14, wherein the treatment elements of each of the first and second rows are aligned along a common axis running parallel to the axis of rotation.

16. The method of claim 8, wherein rotating the treatment rotor about the axis of rotation comprises coupling the treatment rotor to a rotary device via a coupling element to rotate the treatment rotor about the axis of rotation.

* * * * *

UNITED STATES PATENT AND TRADEMARK OFFICE
CERTIFICATE OF CORRECTION

PATENT NO. : 10,227,248 B2
APPLICATION NO. : 14/997646
DATED : March 12, 2019
INVENTOR(S) : Jochen Friedrich Knauer It is certified that error appears in the above-identified patent and that said Letters Patent is hereby corrected as shown below:

In the Claims

Claim 15, Column 17, Line 3, after "method" insert -- of --.

Signed and Sealed this
Thirteenth Day of August, 2019

Andrei Iancu
*Director of the United States Patent and Trademark Office*